US009951281B2

(12) United States Patent
Farneman

(10) Patent No.: US 9,951,281 B2
(45) Date of Patent: Apr. 24, 2018

(54) MICROWAVE BASED SYSTEMS AND METHODS FOR OBTAINING CARBONACEOUS COMPOUNDS FROM POLYPROPYLENE-CONTAINING PRODUCTS

(71) Applicant: John Otis Farneman, Powell, OH (US)

(72) Inventor: John Otis Farneman, Powell, OH (US)

( * ) Notice: Subject to any disclaimer, the term of this patent is extended or adjusted under 35 U.S.C. 154(b) by 414 days.

(21) Appl. No.: 13/753,251

(22) Filed: Jan. 29, 2013

(65) Prior Publication Data

US 2013/0144095 A1    Jun. 6, 2013

Related U.S. Application Data

(63) Continuation-in-part of application No. 11/955,830, filed on Dec. 13, 2007, now Pat. No. 8,382,957.
(Continued)

(51) Int. Cl.
*C10G 1/10* (2006.01)
*C10G 1/02* (2006.01)
(Continued)

(52) U.S. Cl.
CPC .............. *C10G 1/10* (2013.01); *B01J 19/126* (2013.01); *C10B 7/14* (2013.01); *C10B 19/00* (2013.01);
(Continued)

(58) Field of Classification Search
CPC ......... C10B 47/00; C10B 53/07; C10B 19/00; C10B 53/00; C10B 47/28; C10G 1/10; C10G 15/08
See application file for complete search history.

(56) References Cited

U.S. PATENT DOCUMENTS 3,449,213 A    6/1969 Knapp et al.
3,560,347 A    2/1971 Knapp et al.
(Continued)

FOREIGN PATENT DOCUMENTS

DE    4026800 A1    2/1991
WO    91/03281 A1    3/1991
(Continued)

OTHER PUBLICATIONS

Condensers, The Lab Depot, Apr. 3, 2004 (date obtained using Google search tools), available online at: http://www.labdepotinc.com/c-26-glass-condenser.php.*
(Continued)

*Primary Examiner* — Jonathan Miller
*Assistant Examiner* — Jonathan Luke Pilcher
(74) *Attorney, Agent, or Firm* — Benesch Friedlander Coplan & Aronoff LLP

(57) ABSTRACT

Microwave based systems and methods are provided for obtaining carbonaceous compounds from polypropylene-containing products. In one example, embodiment, a method is provided for recovering at least one organic decomposition product from a polypropylene-containing product, the method comprising: placing the polypropylene-containing product in a reduction zone of a material recovery system; flowing an inert gas through the reduction zone from a reduction inlet to a reduction outlet to purge the reduction zone and maintain a positive pressure therein; applying electromagnetic wave energy from an electromagnetic wave generator to the reduction zone via a bifurcated waveguide assembly, while maintaining the polypropylene-containing product in a stationary position for at least a portion of the applying, to yield at least one gaseous organic decomposition product; and exhausting the at least one gaseous organic
(Continued)

decomposition product from the reduction zone along with the inert gas through the reduction outlet.

8 Claims, 10 Drawing Sheets

Related U.S. Application Data

(60) Provisional application No. 60/874,852, filed on Dec. 14, 2006.

(51) Int. Cl.

| | | |
|---|---|---|
| *C10B 53/00* | (2006.01) | |
| *C10B 53/07* | (2006.01) | |
| *B01J 19/12* | (2006.01) | |
| *C10B 7/14* | (2006.01) | |
| *C10B 19/00* | (2006.01) | |
| *H05B 6/80* | (2006.01) | |

(52) U.S. Cl.
CPC ............. *C10B 53/07* (2013.01); *H05B 6/806* (2013.01); *B01J 19/12* (2013.01); *B01J 2219/1269* (2013.01); *C10B 53/00* (2013.01); *C10G 1/02* (2013.01); *H05B 2206/046* (2013.01); *Y02P 20/143* (2015.11)

(56) References Cited

U.S. PATENT DOCUMENTS

| | | |
|---|---|---|
| 3,843,457 A | 10/1974 | Grannen et al. |
| 3,849,332 A | 11/1974 | Bailey et al. |
| 4,055,001 A | 10/1977 | Forster et al. |
| 4,065,361 A | 12/1977 | Hanson |
| 4,153,533 A | 5/1979 | Kirkbride |
| 4,250,158 A | 2/1981 | Solbakken et al. |
| 4,252,487 A | 2/1981 | Jeppson |
| 4,282,066 A | 8/1981 | Wagener et al. |
| 4,319,856 A | 3/1982 | Jeppson |
| 4,376,034 A | 3/1983 | Wall |
| 4,412,841 A | 11/1983 | Du Broff et al. |
| 4,567,340 A | 1/1986 | Latchum, Jr. |
| 4,592,291 A | 6/1986 | Sullivan, III |
| 4,759,300 A | 7/1988 | Hansen et al. |
| 4,776,936 A | 10/1988 | Smith et al. |
| 5,084,140 A | 1/1992 | Holland |
| 5,084,141 A * | 1/1992 | Holland ............................ 201/19 |
| 5,105,563 A | 4/1992 | Fingerson et al. |
| 5,152,074 A | 10/1992 | Kishi |
| 5,237,755 A | 8/1993 | Lowe |
| 5,304,962 A | 4/1994 | Bobadilla et al. |
| 5,330,623 A | 7/1994 | Holland |
| 5,366,595 A * | 11/1994 | Padgett et al. .................. 201/19 |
| 5,373,646 A | 12/1994 | Wosnitza et al. |
| 5,387,321 A | 2/1995 | Holland |
| 5,507,927 A | 4/1996 | Emery |
| 5,536,477 A | 7/1996 | Cha et al. |
| 5,634,281 A | 6/1997 | Nugent |
| 5,864,964 A | 2/1999 | Barragan |
| 5,877,395 A | 3/1999 | Emery |
| 5,899,630 A | 5/1999 | Brock |
| 5,950,325 A | 9/1999 | Mehdizadeh et al. |
| 5,974,687 A | 11/1999 | Gante et al. |
| 6,008,750 A | 12/1999 | Cottle et al. |
| 6,133,500 A | 10/2000 | Emery |
| 6,152,306 A | 11/2000 | Miller |
| 6,184,427 B1 * | 2/2001 | Klepfer et al. ............... 585/241 |
| 6,187,988 B1 | 2/2001 | Cha |
| 6,233,841 B1 | 5/2001 | Beach |
| 6,534,754 B2 | 3/2003 | Schulz et al. |
| 6,618,957 B2 | 9/2003 | Novak et al. |
| 6,864,757 B2 | 3/2005 | Du Toit et al. |
| 7,028,623 B1 | 4/2006 | Pearson |
| 7,101,464 B1 | 9/2006 | Pringle |
| 7,133,584 B2 | 11/2006 | Dawes |
| 7,361,303 B2 | 4/2008 | Kantor |
| 7,607,860 B2 | 10/2009 | Novak |
| 7,629,497 B2 | 12/2009 | Pringle |
| 7,767,187 B2 | 8/2010 | Hong |
| 7,927,465 B2 * | 4/2011 | Novak .................. A62D 3/178 204/157.15 |
| 8,378,161 B1 | 2/2013 | Hemmings et al. |
| 8,466,332 B1 | 6/2013 | Hemmings et al. |
| 8,476,480 B1 * | 7/2013 | Brown .................... C10K 1/04 201/12 |
| 2002/0046474 A1 | 4/2002 | Novak et al. |
| 2002/0090268 A1 | 7/2002 | Haller |
| 2002/0150425 A1 | 10/2002 | Bodish |
| 2003/0070912 A1 | 4/2003 | Holzschuh et al. |
| 2007/0102279 A1 | 5/2007 | Novak |
| 2007/0131591 A1 | 6/2007 | Pringle |
| 2007/0135877 A1 | 6/2007 | Pringle |
| 2008/0179177 A1 | 7/2008 | Cha |
| 2008/0277388 A1 | 11/2008 | Carr |
| 2011/0132902 A1 | 6/2011 | Novak |
| 2011/0215092 A1 | 9/2011 | Novak |

FOREIGN PATENT DOCUMENTS

| | | |
|---|---|---|
| WO | 92/02598 A1 | 2/1992 |
| WO | 93/14821 A1 | 8/1993 |
| WO | 01/03473 A1 | 1/2001 |
| WO | 02/14764 A2 | 2/2002 |

OTHER PUBLICATIONS

"How is tempered glass made?", Scientific American, Feb. 1, 2001 (date obtained using Google search tools), available online at: https://www.scientificamerican.com/article/how-is-tempered-glass-mad/.*
Complaint for Injunctive Relief and Damages, dated Aug. 13, 2010, in *Novak, et al.* v. *Farneman, et al.*, United States District Court for the Southern District of Ohio, Eastern Division, Case No. 2:10-cv-00768.
Defendants' [Farneman, et al.] Post-Hearing Brief in Opposition to Plaintiffs' [Novak, et al.] Motion for Preliminary injunction, dated Oct. 22, 2010, in *Novak, et al.* v. *Farneman, et al.*, United States District Court for the Southern District of Ohio, Eastern Division, Case No. 2:10-cv-00768.
Introducing the EnviroWave Process, www.envirowave.com/index.html, printed on Nov. 7, 2007, The Envirowave Corporation (2007), Fredericktown, OH 1 page.
Drying and Treating Bio-solids with Microwaves, www.envirowave/com/biosolids.html, printed on Nov. 7, 2007, The Envirowave Corporation, Fredericktown, OH 3 pages.
Opinion and Other Denying Plaintiffs' [Novak, et al.] Motion for Preliminary Injunction, dated Nov. 9, 2010, in *Novak, et al.* v. *Farneman, et al.*, United States District Court for the Southern District of Ohio, Eastern Division, Case No. 2:10-cv-00768.
Gaines et al., "Discarded Tires: Energy Conservation Through Alternative Uses," Argonne National Laboratory, ANL/CNSV-5, Dec. 1979, pp. 1, 16, 19, and 22.
Advanced Microwave Technology, "An energy storage device," www.antmicrowave.com/resonant_cav.htm, printed Jan. 14, 2012, NSW 2500, Australia, 2 pages.
Bebb, "Chemistry of Rubber Processing and Disposal." Environmental Health Perspectives, vol. 17, pp. 95-102, Oct. 1976.
Waddell et al., "Pneumatic Tire Compounding," The Goodyear Tire & Rubber Company, pp. 596-611.
Rubber Manufactures Association, "Pyrolysis." www.rma.org/scraptire.html. May 2002, 1 page.
Rubber Manufactures Association, "Tire—Petroleum Energy Comparison." www.rma.org, 1 page.
Dodds et al., "Scrap Tires: A Resource and Technology Evaluation of Tire Pyrolysis and Other Selected Alternative Technologies." EG&G, EGG-2241, Nov. 1983, pp. 1, 4, 18-20.

(56) References Cited

OTHER PUBLICATIONS

CalRecovery, Inc., "Appendix Table D-4. Selected Compounds in Tire-Derived Oil." Environmental Factors of Waste Tire Pyrolysis, Final Report, Jul. 1995, p. D-4.
Zelibor et al., "Recycling Scrap Tires Into New Tires." Scrap Tire Management Council; Rubber Manufacturers Association, p. 1 and 4-6.
Int'l App. No. PCT/US07/87399, International Search Report, dated May 7, 2008, 4 pages. (31126-04004).
Int'l App. No. PCT/US07/87399, Written Opinion of the International Search Authority, dated May 7, 2008, 5 pages. (31126.04004).
Remediation of PCB's and Other Organic Contaminants, www.envirowave.com/organics.htm, printed on Nov. 7, 2007, The Envirowave Corporation, Fredericktown, OH, 3 pages.
The EnviroWave Process and Waste Tire Reduction, www.envirowave.com/scraptirereduction.htm, printed on Nov. 7, 2007, The Envirowave Corporation, Fredericktown, OH, 3 pages.
Frequently Asked Questions About the EnviroWave Microwave Process, www.envirowave.com/faq.htm, printed on Nov. 7, 2007, The Envirowave Corporation, Fredericktown, OH, 3 pages.
$25 Million Fraud Litigation Action Against Exxadon, Environmental Waste Management Corporation, http://findarticles.com/p/articles/mi_m0EIN/is_196_July_25/ai_18519643, printed Apr. 23, 2007, Business Wire (Jul. 25, 1996), 4 pages.
Brahic, Giant microwave turns plastic back to oil, http://environment.newscientist.com/article.ns?id=dn12141&print=true, printed Feb. 14, 2008, NewScientist Environment (Jun. 26, 2007), 2 pages.
New Scientist Magazine Features Global Resource Corp.'s HAWK 10 Emission-Free Recycling Machine, press release by Global Resource Corporation, West Berlin, NJ (Jun. 28, 2007), 2 pages.
Environmental Waste International Inc.—Complete Profile, http://strategis.ic.gc.ca/app/ccc/search/navigate.do?language=eng&portal=1&subPortal . . . , printed Apr. 23, 2007, Industry Canada, Ottawa, Ontario, Canada, 5 pages.
Molecular Waste Technologies, Inc. Introduces you to the 21st Century in Waste Disposal, www.molecularwastetech.com, printed Apr. 23, 2007, Molecular Waste Technologies, Inc., Marietta, GA (2006), 5 pages.
About EnviroWave Corporation, www.envirowave.com/aboutenvirowave.htm, printed Nov. 7, 2007, The Envirowave Corporation, Fredericktown, OH, 3 pages.
Microwave Reduction of Medical Waste and Tires, Ontario Centre for Environmental Technology Advancement (OCETA) Environmental Technology Profiles, CAT. #06-008 / 08-023 / 09-028, www.oceta.ca/profiles/ewi/ewi_tech.html, printed Apr. 23, 2007, OCETA, Mississauga, Ontario, Canada (Jul. 2000), 6 pages.

\* cited by examiner

| Compound | Percent by Weight |
|---|---|
| Formic acid | 0.41% |
| 2-Butenal | 1.06% |
| Acetic acid | 2.72% |
| 2-Propanone, 1-hydroxy- | 1.30% |
| 1,2-Ethanediol | 0.42% |
| 3-Penten-2-one, (E)- | 0.37% |
| 2H-Pyran, 3,4-dihydro-6-methyl- | 1.79% |
| 3-Octene-2,6-dione, 5,5,7-trimethyl-, (E)- | 0.55% |
| Pyridine, 2-methyl- | 0.29% |
| 1-Methoxy-1-buten-3-yne | 0.44% |
| Ethylidenecyclobutane | 0.88% |
| Benzene, 1,3-dimethyl- | 5.06% |
| 2-Butene | 0.59% |
| Butyrolactone | 0.89% |
| 2-Cyclohexen-1-one | 1.02% |
| 1-Pentene | 0.75% |
| n-Propyl acetate | 16.58% |
| 2-Hexanone, 6-(acetyloxy)- | 20.43% |
| Phenol | 1.45% |
| Formic acid, 2-propenyl ester | 0.22% |
| 2-Cyclopenten-1-one, 2-hydroxy-3-methyl- | 0.71% |
| 1,1-Dimethyl-4-methylenecyclohexane | 0.50% |
| 5H-Tetrazol-5-amine | 0.38% |
| Phenol, 2-methyl- | 0.63% |
| 2-Furanmethanol, tetrahydro- | 0.74% |

Figure 5

| Compound | Percent by Weight |
|---|---|
| Cyclobutane, methyl- | 0.07% |
| Cyclopentane | 0.38% |
| 1-Pentene, 2-methyl- | 0.17% |
| Hexane | 0.07% |
| 2-Pentene, 4-methyl-, (Z)- | 0.09% |
| 1-Pentene, 2,4-dimethyl- | 0.09% |
| 2-Pentene, 2,4-dimethyl- | 0.12% |
| 1-Heptene | 0.12% |
| Heptane | 0.26% |
| 1-Heptene, 4-methyl- | 0.29% |
| Heptane, 4-methyl- | 1.05% |
| 2-Heptene, 6-methyl- | 0.12% |
| Cycloheptane | 0.16% |
| Octane | 0.46% |
| Heptane, 2,4-dimethyl- | 1.20% |
| Oxalic acid, cyclohexyl nonyl ester | 1.62% |
| 2,4-Dimethyl-1-heptene | 4.17% |
| Cyclohexane, 1,3,5-trimethyl-, (1.alpha.,3.alpha.,5.beta.)- | 0.16% |
| Ethylbenzene | 0.30% |
| Benzene, 1,3-dimethyl- | 0.40% |
| Heptane, 2,4,6-trimethyl- | 0.48% |
| 2,4,6-Trimethyl-3-heptene | 0.51% |
| Benzene, 1,3-dimethyl- | 0.95% |
| Ethanone, 1-cyclopropyl- | 0.73% |
| Nonane | 0.77% |

Figure 6

| Compound | Percent by Weight |
|---|---|
| Pentane | 0.11% |
| Pentane, 2-methyl- | 0.46% |
| 3-Penten-2-one, 4-methyl- | 0.24% |
| Heptane | 0.41% |
| 4-Methyl-2-heptene | 0.27% |
| Heptane, 4-methyl- | 0.82% |
| 1-Octene | 0.30% |
| Octane | 0.43% |
| 1-Hexene, 3,3,5-trimethyl- | 0.23% |
| Heptane, 2,4-dimethyl- | 0.89% |
| 2,4-Dimethyl-1-heptene | 3.57% |
| Benzene, (1-methylethyl)- | 0.22% |
| Benzene, propyl- | 0.18% |
| Nonane, 4-methyl- | 1.14% |
| Benzene, 1-ethyl-2-methyl- | 0.34% |
| Decane | 2.88% |
| 5-Undecene, (E)- | 0.64% |
| Dodecane | 2.34% |
| Ethanone, 1-cyclopentyl- | 1.33% |
| Undecane | 1.20% |
| 4-Tridecene, (Z)- | 0.50% |
| Dichloroacetic acid, 6-ethyl-3-octyl ester | 1.06% |
| Benzene, 1-methyl-4-(1-methylpropyl)- | 0.90% |
| Dodecane | 2.47% |
| Dodecane, 2-methyl- | 0.23% |

Figure 7

| Compound | Percent by Weight |
|---|---|
| Formic acid | 0.36% |
| 2-Butenal, (E)- | 0.95% |
| Acetic acid | 2.15% |
| 2-Propanone, 1-hydroxy- | 1.13% |
| 1,2-Ethanediol | 0.37% |
| 2H-Pyran, 3,4-dihydro-6-methyl- | 1.37% |
| Ethanone, 1-(6-methyl-7-oxabicyclo[4.1.0]hept-1-yl)- | 0.33% |
| Pyridine, 2-methyl- | 0.22% |
| 1-Butyne | 0.17% |
| Benzene, 1,3-dimethyl- | 3.95% |
| Oxirane, 2-methyl-3-(1-methylethyl)- | 0.82% |
| Butyrolactone | 0.68% |
| 2H-Pyran-2-one, 5,6-dihydro- | 0.57% |
| 1-Pentene | 0.47% |
| 2-Hexanone, 6-(acetyloxy)- | 19.54% |
| 2-Hexanone, 6-(acetyloxy)- | 13.74% |
| Phenol | 1.50% |
| Cyclobutanone, 2-methyl-4-hydroxy- | 0.20% |
| 2-Cyclopenten-1-one, 2-hydroxy-3-methyl- | 0.58% |
| 1,1-Dimethyl-4-methylenecyclohexane | 0.33% |
| Phenol, 2-methyl- | 0.49% |
| 2-Furanmethanol, tetrahydro- | 0.43% |
| Phenol, 3-methyl- | 0.56% |
| 1,3-Propanediamine, N-methyl- | 0.24% |
| Benzoic acid | 0.35% |

Figure 8

| Compound | Percent by Weight |
|---|---|
| Cyclobutane, methyl- | 0.09% |
| Cyclobutane, methyl- | 0.57% |
| 1-Pentene, 2-methyl- | 0.19% |
| Hexane | 0.08% |
| 2-Pentene, 4-methyl- | 0.12% |
| 1-Pentene, 2,4-dimethyl- | 0.15% |
| 2-Pentene, 2,4-dimethyl- | 0.20% |
| 1-Heptene | 0.26% |
| Heptane | 0.51% |
| 1-Heptene, 4-methyl- | 0.61% |
| Heptane, 4-methyl- | 2.43% |
| 2-Heptene, 6-methyl- | 0.27% |
| Cycloheptane | 0.39% |
| Octane | 1.24% |
| Heptane, 2,4-dimethyl- | 2.71% |
| Cyclohexane, propyl- | 1.52% |
| 2,4-Dimethyl-1-heptene | 8.71% |
| Cyclohexane, 1,3,5-trimethyl-, (1.alpha.,3.alpha.,5.beta.)- | 0.35% |
| Ethylbenzene | 0.98% |
| Benzene, 1,3-dimethyl- | 1.30% |
| Heptane, 2,4,6-trimethyl- | 1.06% |
| 2,4,6-Trimethyl-3-heptene | 1.12% |
| Benzene, 1,3-dimethyl- | 2.34% |
| Ethanone, 1-cyclopropyl- | 1.49% |
| Nonane | 2.10% |

Figure 9

| Compound | Percent by Weight |
|---|---|
| Pentane, 2-methyl- | 0.52% |
| 2-Pentene, 3,4-dimethyl-, (Z)- | 0.39% |
| Heptane | 0.74% |
| 2-Heptene, 4-methyl-, (E)- | 0.65% |
| Heptane, 4-methyl- | 1.87% |
| Cyclooctane | 0.70% |
| Octane | 1.14% |
| 1-Hexene, 3,3,5-trimethyl- | 0.49% |
| Heptane, 2,4-dimethyl- | 1.87% |
| 2,4-Dimethyl-1-heptene | 7.61% |
| Benzene, 1,2,3-trimethyl- | 0.64% |
| Benzene, propyl- | 0.47% |
| Benzene, 1,3,5-trimethyl- | 2.12% |
| Benzene, 1-ethyl-2-methyl- | 1.00% |
| Decane | 4.73% |
| Benzene, 1-methyl-2-(1-methylethyl)- | 0.54% |
| Indane | 0.88% |
| Benzene, 1-methyl-2-(1-methylethyl)- | 2.83% |
| Ethanone, 1-cyclopentyl- | 1.33% |
| 1-Undecene | 0.69% |
| Undecane | 1.76% |
| Heptylcyclohexane | 0.68% |
| Dichloroacetic acid, 6-ethyl-3-octyl ester | 1.36% |
| Benzene, 1-methyl-4-(1-methylpropyl)- | 1.36% |
| Benzene, 1-methyl-4-(2-methylpropyl)- | 0.33% |

Figure 10

MICROWAVE BASED SYSTEMS AND METHODS FOR OBTAINING CARBONACEOUS COMPOUNDS FROM POLYPROPYLENE-CONTAINING PRODUCTS

CROSS-REFERENCE TO RELATED APPLICATIONS

This application is a continuation-in-part application of U.S. patent application Ser. No. 11/955,830, filed on Dec. 13, 2007, and which claims priority to U.S. Provisional Patent Application Ser. No. 60/874,852, filed on Dec. 14, 2006. Both of these related applications are incorporated by reference herein in their entireties.

BACKGROUND

Every year, scores of billions of plastic water and soda bottles are purchased and used in the United States alone. Plastic water and soda bottles are often comprised of polyethylene terepthalate (PET), or plastic #1. PET is reported to have a recycling rate of approximately 25 percent; indeed, recycling programs for PET products are relatively ubiquitous. However, nearly every one of those water bottles includes a plastic cap. The caps are typically comprised of polypropylene (PP), or plastic #5. The two plastics cannot generally be recycled together—PP melts at a temperature of nearly 160 degrees Fahrenheit higher than PET. If a cap gets mixed in with bottles, the entire batch may be ruined because there is un-melted plastic in the mix. Therefore, many municipalities do not accept the caps for recycling, or PP products in general.

PP products are, thus, often simply discarded. PP products are not limited to bottle caps. For example, PP products include, for example, common packaging used in containers for cottage cheese, yogurt, cream cheese, ricotta cheese, margarine, hummus, medicine bottles, some plastic ice cream containers, food storage and take-out containers, as well as flip caps on tubes and food product bottles (e.g., condiments), jar lids (e.g., peanut butter), and laundry detergent lids. At best, when not recycled, these PP products end up in landfills. Too often, PP products such as bottle caps end up as litter, where they pose a significant hazard to wildlife and the environment.

Not only do discarded PP products present an environmental risk, but they also represent lost opportunity. Polypropylene is a hydrocarbon, as are gaseous and liquid fuels and oils. Proper decomposition of PP products should yield useful hydrocarbon products. Thus, methods and systems are needed to decompose waste PP products into useful hydrocarbon products, including fuels.

SUMMARY

In one embodiment, a method is provided for recovering at least one organic decomposition product from a polypropylene-containing product, the method comprising: placing the polypropylene-containing product in a reduction zone of a material recovery system; flowing an inert gas through the reduction zone from a reduction inlet to a reduction outlet to purge the reduction zone and maintain a positive pressure therein; applying electromagnetic wave energy from an electromagnetic wave generator to the reduction zone via a bifurcated waveguide assembly, while maintaining the polypropylene-containing product in a stationary position for at least a portion of the applying, to yield at least one gaseous organic decomposition product; and exhausting the at least one gaseous organic decomposition product from the reduction zone along with the inert gas through the reduction outlet.

In another embodiment, a method is provided for recovering at least one organic decomposition product from a source substance comprising at least one of crushed, ground, or shredded polypropylene-containing bottle caps, the method comprising: contacting the crushed, ground, or shredded polypropylene-containing bottle caps with a substance which is more absorptive of electromagnetic wave energy than polypropylene, such as activated carbon; placing the crushed, ground, or shredded polypropylene-containing bottle caps and the activated carbon in a reduction zone of a microwave applicator; flowing an inert gas through the reduction zone from a reduction inlet to a reduction outlet to purge the reduction zone and maintain a positive pressure therein; applying electromagnetic wave energy from an electromagnetic wave generator to the reduction zone via a bifurcated waveguide assembly, while maintaining the crushed, ground, or shredded polypropylene-containing bottle caps and the activated carbon in a stationary position for at least a portion of the applying, to yield at least one gaseous organic decomposition product; and exhausting the at least one gaseous organic decomposition product from the reduction zone along with the inert gas through the reduction outlet.

In another embodiment, a material recovery system is provided, the material recovery system comprising: a housing adapted to receive a predominately polypropylene product in a reduction zone, the housing including an inert gas inlet and a reduction outlet in operative communication with the reduction zone; wherein the inert gas inlet is configured to permit purging of the reduction zone and maintaining of a positive pressure therein, and wherein the reduction outlet is configured to exhaust an initial gaseous content of the reduction zone during the purging, and to exhaust at least some of an inert gas during the maintaining of the positive pressure; an electromagnetic wave generator in operative communication with the housing and adapted to apply electromagnetic wave energy to the reduction zone via a bifurcated waveguide assembly to reduce the polypropylene product in the reduction zone to at least one gaseous organic decomposition product, the at least one gaseous organic decomposition product being exhausted with the inert gas via the reduction outlet during the maintaining of the positive pressure; and wherein the reduction zone is configured such that the predominately polypropylene product is stationary in the reduction zone during at least a portion of application of the electromagnetic wave energy.

BRIEF DESCRIPTION OF THE DRAWINGS

In the accompanying figures, diagrams, charts, and experimental data are given that, together with the detailed description provided below, describe example embodiments of the claimed invention.

FIG. 5 shows example products of reaction developed from molecular excitation by microwave energy of crushed polypropylene-containing bottle caps and colored bottles.

FIG. 6 shows example products of reaction developed from molecular excitation by microwave energy of crushed polypropylene-containing bottle caps and colored bottles.

FIG. 7 shows example products of reaction developed from molecular excitation by microwave energy of crushed polypropylene-containing bottle caps and colored bottles.

FIG. 8 shows example products of reaction developed from molecular excitation by microwave energy of crushed polypropylene-containing bottle caps and colored bottles.

FIG. 9 shows example products of reaction developed from molecular excitation by microwave energy of crushed polypropylene-containing bottle caps and colored bottles.

FIG. 10 shows example products of reaction developed from molecular excitation by microwave energy of crushed polypropylene-containing bottle caps and colored bottles.

DETAILED DESCRIPTION

Figure 1:
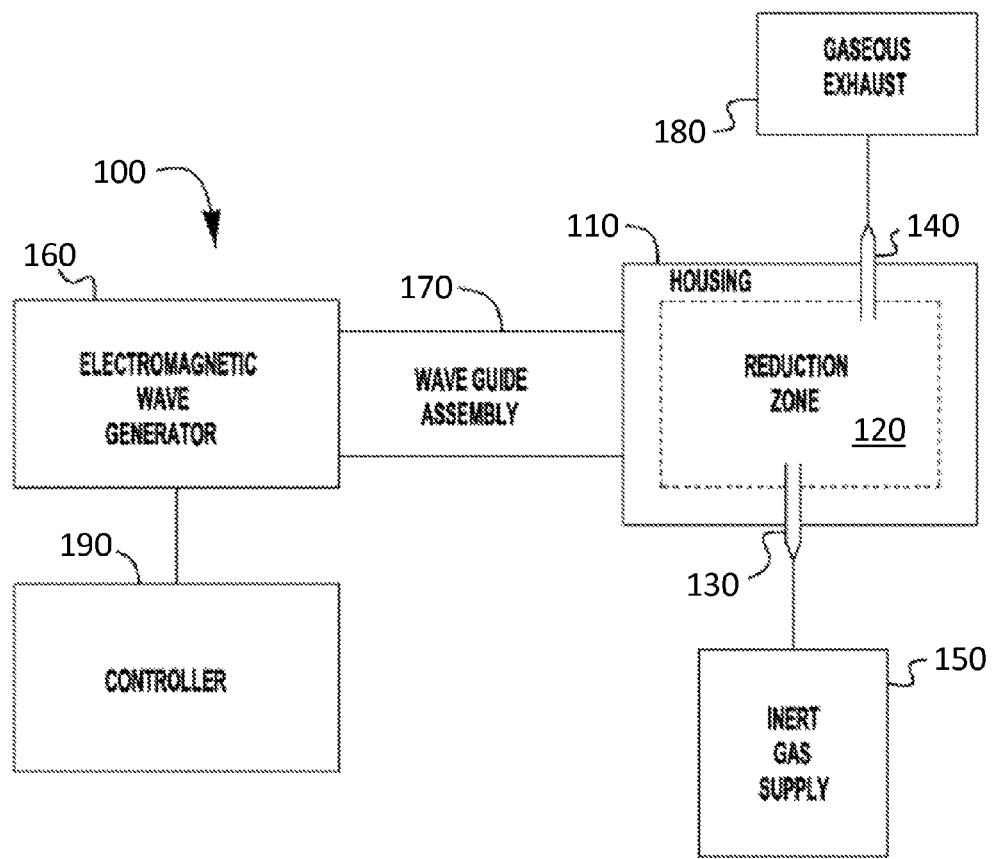
FIG. 1 is a block diagram of an example embodiment of a material recovery system 100.

Methods and systems are provided for recovering at least one organic decomposition product from a polypropylene-containing product. FIG. 1 is a block diagram of an example embodiment of a material recovery system 100. Suitable material recovery systems are known in the art, and may include, for example, material recovery systems of the type disclosed in U.S. patent application Ser. No. 11/955,830, incorporated by reference herein in its entirety, and as otherwise manufactured or supplied by Micro Recovery Solutions LLC, in Delaware, Ohio.

As shown in FIG. 1, material recovery system 100 comprises a housing 110 adapted to receive a polypropylene-containing product in a reduction zone 120, housing 110 including an inert gas inlet 130 and a reduction outlet 140 in operative communication with reduction zone 120. As shown in FIG. 1, inert gas supply 150 provides inert gas (e.g., argon, nitrogen, or the like) through inert gas inlet 130 to purge reduction zone 120 and maintain a positive pressure therein. Reduction outlet 140 may be configured to exhaust an initial gaseous content of reduction zone 120 during the purging, and to exhaust at least some of the inert gas during the maintaining of the positive pressure. Material recovery system 100 may further comprise an electromagnetic wave generator 160 in operative communication with housing 110 and adapted to apply electromagnetic wave energy to reduction zone 120 via a bifurcated waveguide assembly 170 to reduce the polypropylene-containing product in the reduction zone to at least one gaseous organic decomposition product, the at least one gaseous organic decomposition product being exhausted as a gaseous exhaust 180 with the inert gas via reduction outlet 140 during the maintaining of the positive pressure. The polypropylene-containing product is stationary in the reduction zone during at least a portion of the application of the electromagnetic wave energy. In one embodiment, the polypropylene-containing product is stationary in the reduction zone for at least one minute during the application of the electromagnetic wave energy.

Material recovery system 100 may further comprise a controller 190. Controller 190 may be in operative communication with electromagnetic wave generator 160 to control application and removal of the electromagnetic wave energy to reduction zone 120. Controller 190 may also permit the power level, frequency, or other parameters of the electromagnetic wave energy to be adjusted. In other embodiments, controller 190 may control inert gas supply 150 for purging and maintaining of the positive pressure within reduction zone 120.

Figure 2:
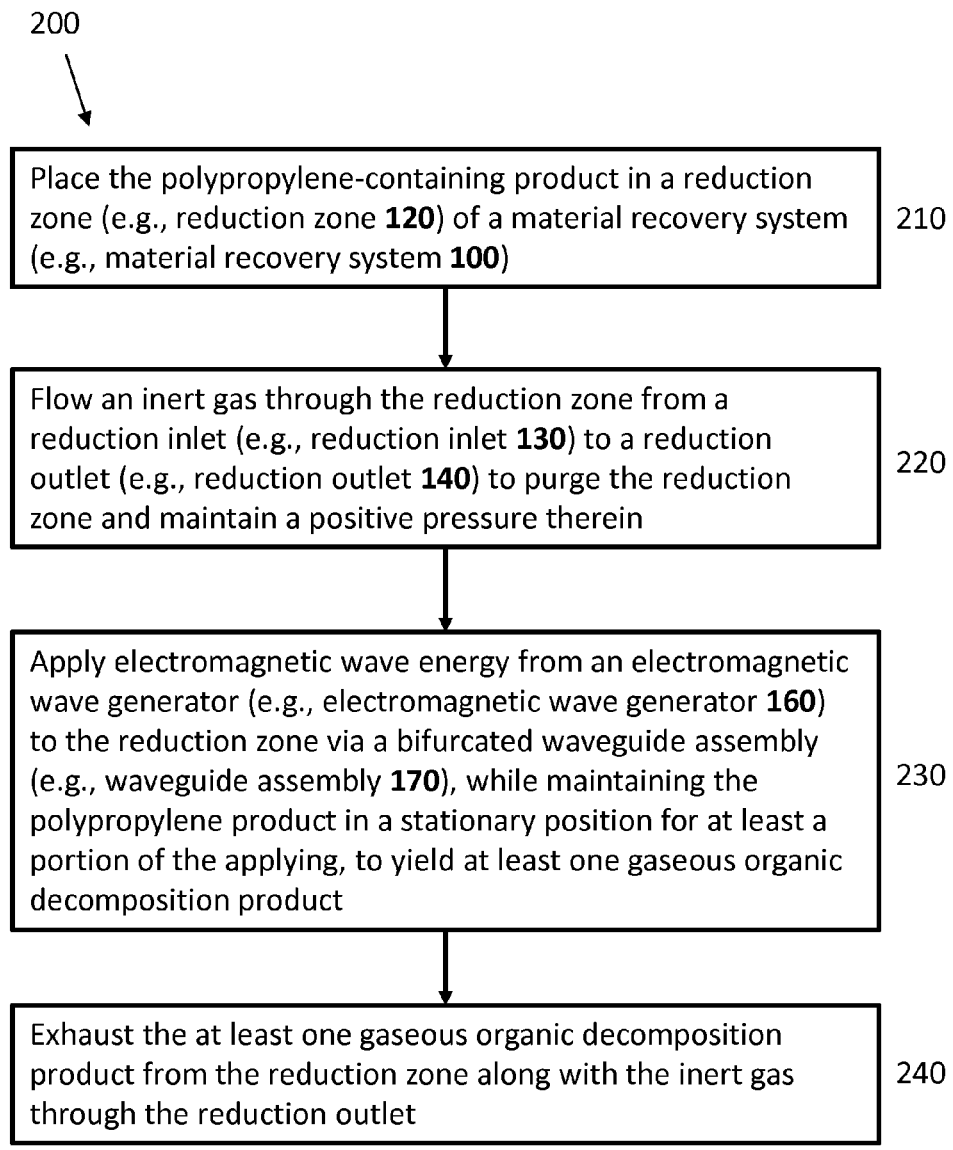
FIG. 2 is a flow chart of an example embodiment of a method 200 for recovering at least one organic decomposition product from a polypropylene-containing product.

Thus, in one embodiment, shown in FIG. 2, a method 200 is provided for recovering at least one organic decomposition product from a polypropylene-containing product, method 200 comprising: placing the polypropylene-containing product in a reduction zone (e.g., reduction zone 120) of a material recovery system (e.g., material recovery system 100) (step 210); flowing an inert gas through the reduction zone from a reduction inlet (e.g., reduction inlet 130) to a reduction outlet (e.g., reduction outlet 140) to purge the reduction zone and maintain a positive pressure therein (step 220); applying electromagnetic wave energy from an electromagnetic wave generator (e.g., electromagnetic wave generator 160) to the reduction zone via a bifurcated waveguide assembly (e.g., waveguide assembly 170), while maintaining the polypropylene product in a stationary position for at least a portion of the applying, to yield at least one gaseous organic decomposition product (step 230); and exhausting the at least one gaseous organic decomposition product from the reduction zone along with the inert gas through the reduction outlet (step 240).

The polypropylene-containing product may be any polypropylene-containing item which may be at least one of crushed, ground, shredded, or otherwise sized and able to be placed within reduction zone 120. For example, suitable polypropylene containing products may include bottle caps, containers for cottage cheese, yogurt, cream cheese, ricotta cheese, margarine, hummus, medicine bottles, plastic ice cream containers, food storage and take-out containers, as well as flip caps on tubes and food product bottles (e.g., condiments), jar lids (e.g., peanut butter), and laundry detergent lids.

The electromagnetic wave energy may be at a select ultra-high frequency (UHF) (i.e., 300-3,000 MHz), such as 915 MHz or 2,450 MHz. Other UHF frequencies may also be selected for the electromagnetic waves. The electromagnetic wave energy may also be referred to as microwave energy.

In some embodiments, bifurcated waveguide assembly (e.g., waveguide assembly 170) is configured to divide the electromagnetic wave energy into a first electromagnetic wave energy and a second electromagnetic wave energy, wherein the first electromagnetic wave energy is 90 degrees out of phase with the second electromagnetic wave energy.

Figure 3:
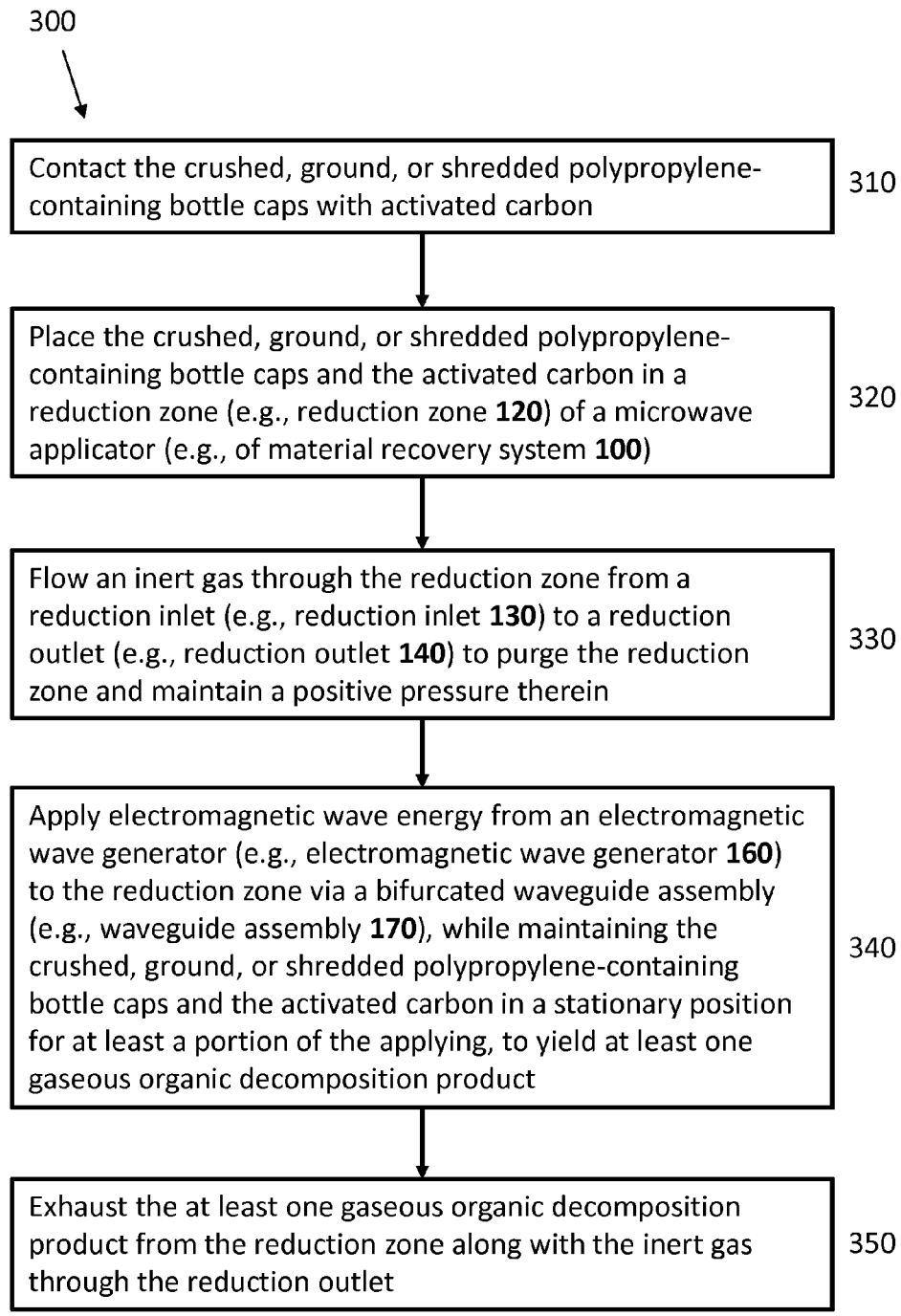
FIG. 3 is a flow chart of an example embodiment of a method 300 for recovering at least one organic decomposition product from a polypropylene-containing product.

In some embodiments, the polypropylene-containing product may be contacted with a substance that is more absorptive of microwave energy than polypropylene. For example, activated carbon recovered from subjecting crushed, ground, shredded, or otherwise sized tires to the systems and methods disclosed in U.S. patent application Ser. No. 11/955,830 may be useful to mix with crushed, ground, shredded, or otherwise sized polypropylene. Thus, in one embodiment, shown in FIG. 3, method 300 is provided for recovering at least one organic decomposition product from a source substance comprising at least one of crushed, ground, or shredded polypropylene-containing bottle caps, method 300 comprising: contacting the crushed, ground, or shredded polypropylene-containing bottle caps with activated carbon (step 310); placing the crushed, ground, or shredded polypropylene-containing bottle caps and the activated carbon in a reduction zone (e.g., reduction zone 120) of a microwave applicator (e.g., of material recovery system 100) (step 320); flowing an inert gas through the reduction zone from a reduction inlet (e.g., reduction inlet 130) to a reduction outlet (e.g., reduction outlet 140) to purge the reduction zone and maintain a positive pressure therein (step 330); applying electromagnetic wave energy from an electromagnetic wave generator (e.g., electromagnetic wave generator 160) to the reduction zone via a bifurcated waveguide assembly (e.g., waveguide assembly 170), while maintaining the crushed, ground, or shredded polypropylene-containing bottle caps and the activated carbon in a stationary position for at least a portion of the applying, to yield at least one gaseous organic decomposition product (step 340); and exhausting the at least one gaseous organic decomposition product from the reduction zone along with the inert gas through the reduction outlet (step 350).

Figure 4:
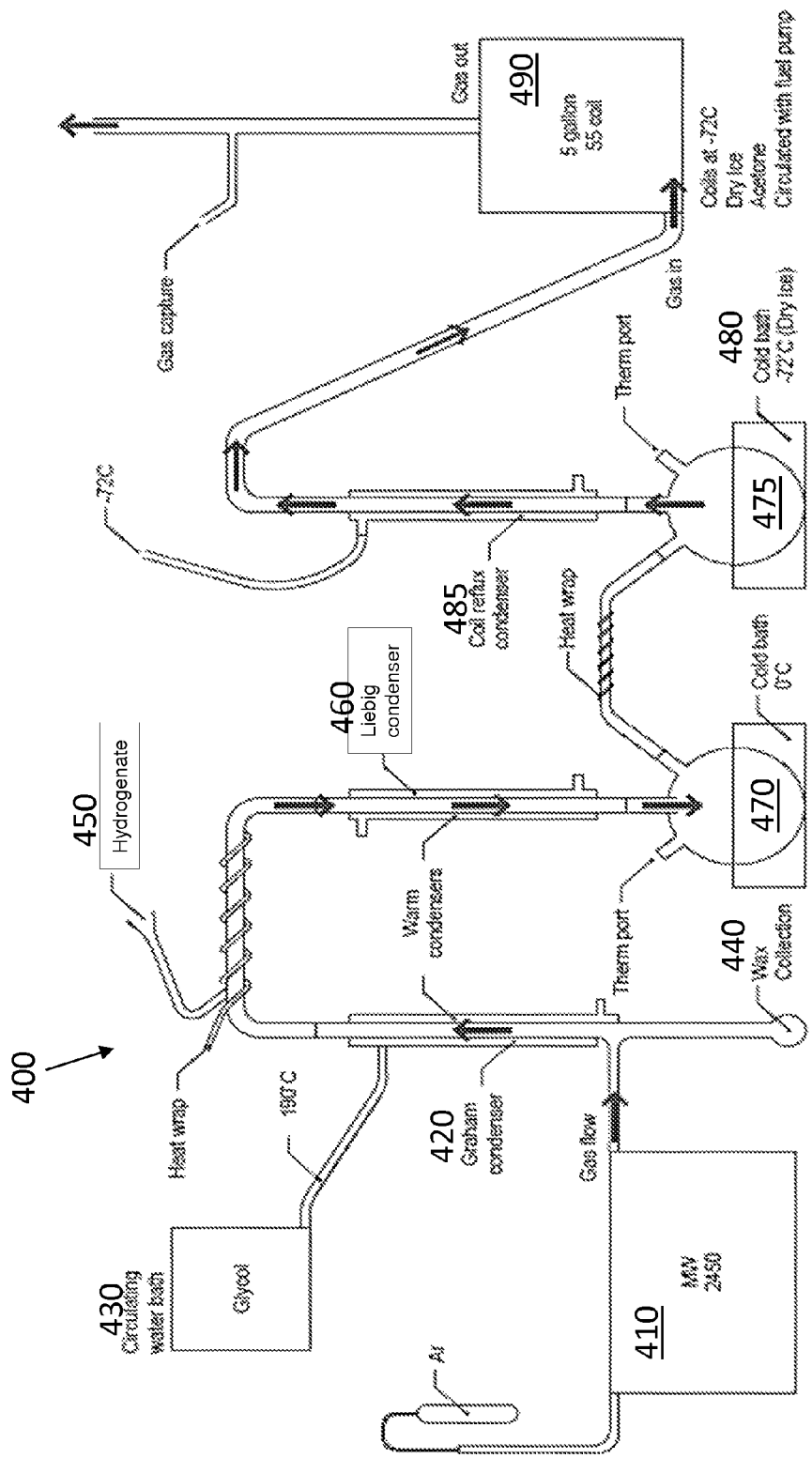
FIG. 4 shows one example condensation/collection schematic for an exhaust gas stream, with its products of reaction developed from molecular excitation by microwave energy, upon exit from a reduction zone of a material recovery system.

FIG. 4 shows one example condensation/collection schematic 400 for the exhaust gas stream, with its products of reaction developed from molecular excitation by microwave energy, upon exit from a reduction zone of a material recovery system (e.g., reduction zone 120 of material recovery system 100). Thus, with reference to FIG. 4, gas exhaust from the reduction zone (shown in FIG. 4 simply as a conventional microwave and numbered 410), having an approximate temperature of 260° C., is routed through tempered glass tubing to a first condenser, for example, a Graham condenser 420. In one embodiment, the coolant is supplied to Graham condenser 420 at a temperature above room temperature. In one example embodiment, shown in FIG. 4, the coolant may be glycol from a glycol circulating bath (shown in FIG. 4 as 430) and the coolant temperature may be approximately 190° C. In one embodiment, wax substances formed between the exit of exhaust gases from reduction zone 410 and exit from Graham condenser 420 may be collected in a wax collection unit 440. Exhaust gas exiting the Graham condenser may be routed through heated tempered glass tubing and contacted with a hydrogenation source 450, e.g., $H_2$ gas, to another condenser, e.g., a Liebig condenser 460. In one embodiment, coolant is supplied to Liebig condenser 460 at a temperature above room temperature. In one example embodiment, shown in FIG. 4, the coolant may be glycol from a glycol circulating bath (shown in FIG. 4 as 430) and the coolant temperature may be approximately 190° C.

With continued reference to FIG. 4, Liebig condenser 460 may be in fluid communication with a first collection vessel 470. As shown, first collection vessel 470 may be cooled to about 0° C. in an ice bath to condense a first fraction of organic decomposition products. Uncondensed exhaust gas may be routed from first collection vessel 470 through heated tempered glass tubing to a second collection vessel 475. As shown in FIG. 4, second collection vessel 475 may be cooled to about −72° C. in a dry ice/acetone bath supplied from a dry ice/acetone circulating bath (shown in FIG. 4 as 480) to condense a second fraction of organic decomposition products.

Second collection vessel 475 may be in fluid communication with a condenser, e.g., a coil reflux condenser 485, wherein various carbon-rich waxes may be collected. Uncondensed exhaust gas may be routed from coil reflux condenser 485 through tempered glass tubing to a third collection vessel 490. As shown FIG. 4, third collection vessel 490 may be cooled to about −72° C. in a dry ice/acetone bath supplied from dry ice/acetone circulating bath 480 to condense a third fraction of organic decomposition products.

FIG. 4 is only one example embodiment of a collection/condensation mechanism. More or fewer condensers, collection vessels, and the like may be included. Different types of condensers, collection vessels, coolants, and the like may be included. Other post-microwave application collection/condensation mechanisms may be suitable, including those disclosed in U.S. patent application Ser. No. 11/955,830.

The following examples demonstrate that the systems and methods described herein are useful to recover carbonaceous material, including fuels, from polypropylene-containing products.

EXAMPLES

Certain embodiments are described below in the form of examples. It is impossible to depict every potential application of the invention. Thus, while the embodiments are described in considerable detail, it is not the intention to restrict or in any way limit the scope of the appended claims to such detail, or to any particular embodiment.

Example 1: Recovery of Carbonaceous Material from Crushed Polypropylene Containing Bottle Caps and Colored Bottles A 429.1 g mixture of polypropylene-containing bottle caps and polypropylene-containing bottles, shredded into pieces between one eighth and one quarter inch, was mixed with 200 g of activated carbon (acquired from microwaving shredded tires as disclosed in U.S. patent application Ser. No. 11/955,830), and placed in a 500 mL beaker lined with insulating material. The beaker was placed in a 4 L vessel. The vessel was sealed with high temperature gasket material. The vessel was placed in a Panasonic® NE-3280 microwave oven modified with an inert gas inlet tube and process gas outlet tube. The tubes were connected to corresponding connections on the vessel.

Inert gas was introduced into the vessel from an argon tank system and regulator. The vessel was purged with argon for about 3 min.

After the purge was completed, microwave energy was applied to the feedstock inside the vessel. Specifically, microwave energy was applied from both the top and the bottom of the microwave at a rate of 1600 W in 2 min intervals for 20 min. At the end of each 2 min interval, the microwave was opened to check the vessel's seals for leaks.

Gray colored fuel gas entered the tempered glass tubing from the process gas outlet tube. The fuel gas, having an approximate temperature of 260° C., was routed through the tempered glass tubing to a Graham condenser (see, e.g., FIG. 4, 420). Glycol coolant was supplied to the Graham condenser from a glycol circulating bath (see, e.g., FIG. 4, 430) at a temperature of approximately 190° C. Exhaust gas exiting the Graham condenser was routed through heated tempered glass tubing to a Liebig condenser (see, e.g., FIG. 4, 460). Glycol coolant was supplied to the Liebig condenser from a glycol circulating bath (see, e.g., FIG. 4, 430) at a temperature of approximately 190° C. A yellow liquid and a wax-like substance were collected in a first flat bottom flask bathed in a 0° C. ice water bath (see FIG. 4, 470). The yellow liquid was separated from the wax, and the content of each was evaluated via GC-MS.

Details of the GC-MS are as follows. An Agilent 7890A GC, equipped with an HP-5MS column (30 m×250 μm×0.25 μm, constant flow 0.9 mL/min,) and a 7693 autosampler, injecting 5 μL of sample into a split injector held at 300° C. with a 200:1 split ratio, and 5975C VL quadrupole (150° C.) mass selective detector (MSD) with electron ionization (EI at 230° C.) operating in the 5-550 m/z range using default settings generated by a daily autotune, was used. The oven was operated at 40° C. for 5 min, then heated at 5° C./min to 300° C. and held for 5 min. The total ion chromatograph (TIC) was obtained and auto integration and identification (NIST mass spectra library, U+A: 1, Flag Threshold: 1%, Min Est Purity: 50%, with tilting) was completed using Enhanced MSD ChemStation® E.02.01.1177.

The gas chromatographic analyses of liquids were performed using a Shimadzu GC-MS QP5050A equipped with a capillary column Petrocol™ DH 24160-U (100 m length, 0.25 mm diameter, 0.5 µm stationary phase), using a 1:30 split ratio and a quadruple mass (MS) detector with electron ionization, operating in the mass range 40-450 m/z. The oven operated at 298 K for 15 min, was heated at 2.5 K/min up to 523 K, and was kept at this temperature for 15 min. The total ion chromatography (TIC) was obtained with a signal-noise ratio of five, and the area percentage was reported without any response factors correction. The compounds were identified using the NIST mass spectra library.

The yellow liquid was analyzed neat. The carbonaceous content of the yellow liquid is shown in tabular form in FIG. 5.

Solid products are unable to be directly introduced into the GC-MS. Thus, with respect to the wax, pentane and m-xylene were chosen as solvents. Pentane allowed for an analysis of non-polar compounds. The carbonaceous content of the wax dissolved in pentane is shown in tabular form in FIG. 6. m-Xylene allowed for analysis of slightly polar compounds. The carbonaceous content of the wax dissolved in m-xylene is shown in tabular form in FIG. 7.

The gray colored fuel gas that did not condense continued into a second flat bottom flask bathed in a −75° C. dry ice/acetone bath (see FIG. 4, 475), again as a yellow liquid and a wax-like substance. The yellow liquid was separated from the wax and the content of each was evaluated via the GC-MS. The yellow liquid was analyzed neat. The carbonaceous content of the yellow liquid is shown in tabular form in FIG. 8.

With respect to the wax, pentane and m-xylene were again chosen as solvents. The carbonaceous content of the wax dissolved in pentane is shown in tabular form in FIG. 9. The carbonaceous content of the wax dissolved in m-xylene is shown in tabular form in FIG. 10.

Generally speaking, carbonaceous products produced from polypropylene chips had carbon counts normally distributed from $C_5$ to $C_{25}$, centered at $C_{15}$. 80% of the product is comprised of alkanes (paraffins), 13% alkenes (olefins), and 6% aromatics, with the balance being alcohols.

At 15 min, the gray colored fuel gas became a clear fuel gas. This continued until the end of the run at 20 min. After the vessel cooled it was removed from the microwave and opened. The shredded polypropylene had been reduced to carbon.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A method for recovering an organic decomposition product from a polypropylene-containing product, the method comprising:

placing the polypropylene-containing product in a reduction zone of a material recovery system;

flowing an inert gas through the reduction zone from a reduction inlet to a reduction outlet to purge the reduction zone and maintain a positive pressure therein;

applying electromagnetic wave energy from an electromagnetic wave generator to the polypropylene-containing product in the reduction zone in a multi-mode form via a bifurcated waveguide assembly while maintaining the polypropylene-containing product in a stationary position for a controlled period of time yield a gaseous organic decomposition product;

exhausting the gaseous organic decomposition product from the reduction zone along with the inert gas through the reduction outlet;

flowing the gaseous organic decomposition product through tempered glass tubing from the reduction outlet to a Graham condenser;

supplying coolant to the Graham condenser to cool the gaseous organic decomposition product within the Graham condenser;

flowing the gaseous organic decomposition product through heated tempered glass tubing from the Graham condenser to a Liebig condenser;

supplying coolant to the Liebig condenser to cool the gaseous organic decomposition product within the Liebig condenser;

flowing the gaseous organic decomposition product from the Liebig condenser to a first collection vessel;

supplying coolant to the first collection vessel to cool the gaseous organic decomposition product within the first collection vessel;

flowing the gaseous organic decomposition product through heated tempered glass tubing from the first collection vessel to a second collection vessel;

supplying coolant to the second collection vessel to cool the gaseous organic decomposition product within the second collection vessel;

flowing the gaseous organic decomposition product from the second collection vessel to a coil reflux condenser;

supplying coolant to the coil reflux condenser to cool the gaseous organic decomposition product within the coil reflux condenser;

flowing the gaseous organic decomposition product through tempered glass tubing from the coil reflux condenser to a third collection vessel; and supplying coolant to the third collection vessel to cool the gaseous organic decomposition product within the third collection vessel.

2. The method of claim 1, wherein the polypropylene-containing product comprises polypropylene-containing material that is at least one of crushed, ground, or shredded.

3. The method of claim 1, wherein the polypropylene-containing product comprises a bottle cap that is at least one of crushed, ground, or shredded.

4. The method of claim 1, further comprising contacting the polypropylene-containing product with a compound which is more absorptive of the electromagnetic wave energy than the polypropylene-containing product.

5. The method of the claim 1, further comprising contacting the polypropylene-containing product with activated carbon.

6. The method of claim 1, further comprising reducing the polypropylene-containing product to at least one solid by-product when the electromagnetic wave energy is applied.

7. A method for recovering an organic decomposition product from a source substance comprising at least one of crushed, ground, or shredded polypropylene-containing bottle caps, the method comprising:
contacting the source substance with activated carbon;
placing the source substance and the activated carbon in a reduction zone of a microwave applicator;
flowing an inert gas through the reduction zone from a reduction inlet to a reduction outlet to purge the reduction zone and maintain a positive pressure therein;
applying electromagnetic wave energy from an electromagnetic wave generator to the source substance in the reduction zone in a multi-mode form via a bifurcated waveguide assembly while maintaining the source substance and the activated carbon in a stationary position for a controlled period of time to yield a gaseous organic decomposition product;
exhausting the gaseous organic decomposition product from the reduction zone along with the inert gas through the reduction outlet;
flowing the gaseous organic decomposition product through tempered glass tubing from the reduction outlet to a Graham condenser;
supplying coolant to the Graham condenser to cool the gaseous organic decomposition product within the Graham condenser;
flowing the gaseous organic decomposition product through heated tempered glass tubing from the Graham condenser to a Liebig condenser;
supplying coolant to the Liebig condenser to cool the gaseous organic decomposition product within the Liebig condenser;
flowing the gaseous organic decomposition product from the Liebig condenser to a first collection vessel;
supplying coolant to the first collection vessel to cool the gaseous organic decomposition product within the first collection vessel;
flowing the gaseous organic decomposition product through heated tempered glass tubing from the first collection vessel to a second collection vessel;
supplying coolant to the second collection vessel to cool the gaseous organic decomposition product within the second collection vessel;
flowing the gaseous organic decomposition product from the second collection vessel to a coil reflux condenser;
supplying coolant to the coil reflux condenser to cool the gaseous organic decomposition product within the coil reflux condenser;
flowing the gaseous organic decomposition product through tempered glass tubing from the coil reflux condenser to a third collection vessel; and
supplying coolant to the third collection vessel to cool the gaseous organic decomposition product within the third collection vessel.

8. The method of claim 7, further comprising reducing the source substance to at least one solid by-product when the electromagnetic wave energy is applied.

\* \* \* \* \*